(12) United States Patent
Cousin et al.

(10) Patent No.: US 6,991,058 B2
(45) Date of Patent: Jan. 31, 2006

(54) HYDROSTATIC TRANSMISSION DEVICE OF A MOBILE MACHINE

(75) Inventors: Jean-Claude Cousin, Ponpoint (FR); Jean Heren, La Neuville sur Ressons (FR); Philippe Lucienne, Aumont (FR)

(73) Assignee: Poclain Hydraulics Industrie, Verberie (FR)

( * ) Notice: Subject to any disclaimer, the term of this patent is extended or adjusted under 35 U.S.C. 154(b) by 119 days.

(21) Appl. No.: 10/484,908

(22) PCT Filed: Jul. 19, 2002

(86) PCT No.: PCT/FR02/02582

§ 371 (c)(1),
(2), (4) Date: Jan. 26, 2004

(87) PCT Pub. No.: WO03/013896

PCT Pub. Date: Feb. 20, 2003

(65) Prior Publication Data

US 2004/0216456 A1 Nov. 4, 2004

(30) Foreign Application Priority Data

Aug. 9, 2001 (FR) .......................... 01 10633

(51) Int. Cl.
*B60K 17/356* (2006.01)

(52) U.S. Cl. ...................... 180/242; 180/307
(58) Field of Classification Search ............... 180/233, 180/242, 243, 305, 307, 6.3; 60/425, 459, 60/468; 91/492

See application file for complete search history.

(56) References Cited

U.S. PATENT DOCUMENTS

| 3,641,765 | A | * | 2/1972 | Hancock et al. ............... 60/484 |
|---|---|---|---|---|
| 3,916,625 | A | * | 11/1975 | Holtkamp .................... 60/421 |
| 4,528,871 | A | * | 7/1985 | Nembach .................. 74/733.1 |
| 5,137,100 | A | * | 8/1992 | Scott et al. ................. 180/6.48 |
| 6,099,273 | A | * | 8/2000 | Allart et al. ................. 417/491 |
| 6,230,829 | B1 | * | 5/2001 | Martin et al. .................. 180/6.3 |
| 6,354,392 | B1 | * | 3/2002 | Cousin et al. ............... 180/242 |
| 6,386,307 | B1 | * | 5/2002 | Martin et al. ............... 180/242 |
| 6,675,575 | B1 | * | 1/2004 | Cunningham ................. 60/425 |

FOREIGN PATENT DOCUMENTS

| DE | 004316300 A1 | * | 11/1994 |
|---|---|---|---|
| EP | 0547947 | | 6/1993 |
| EP | 0816153 | | 1/1998 |
| EP | 1010566 | | 6/2000 |
| EP | 1026025 | | 8/2000 |
| FR | 2719001 | | 10/1995 |

* cited by examiner

*Primary Examiner*—Lesley D. Morris
(74) *Attorney, Agent, or Firm*—Ladas & Parry LLP (57) ABSTRACT

The vehicle has two groups of displacement members (1, 2, 3, 4), one of which groups is steerable. The apparatus comprises a closed transmission circuit which includes a pump (50) and hydraulic motors (10, 20, 30, 40). A first group of motors that serves to drive two displacement members on the same axle comprises at least two double motors (30, 40), each having two operating cubic capacities forming two elementary motors (31, 32; 41, 42). The first elementary motor (31, 41) of each of the double motors is connected to the pump (50) in parallel with a motor (10, 20) of the other group, while the second elementary motor (32, 42) is connected in series with said motor of the other group. There thus exist first and second series ducts (C32, C42) between the motors. The series ducts are connected to a low-pressure circuit via means (66) for limiting the pressure in the series ducts (C32, C42), and the apparatus further comprises means (R58, R60, R62) for limiting the flow rate of fluid flowing between the series ducts and the low-pressure circuit.

24 Claims, 7 Drawing Sheets

HYDROSTATIC TRANSMISSION DEVICE OF A MOBILE MACHINE

The present invention relates to hydrostatic transmission apparatus for a vehicle having a group of front displacement members and a group of rear displacement members, the displacement members of one of said groups being steerable relative to the displacement member(s) of the other group.

Thus, the displacement member(s) of one of the groups is/are steerable (depending on the type of vehicle, e.g. a tractor for viticulture, the steerable group can be the front group or the rear group), or else the vehicle, e.g. a roller compactor, is articulated between its front and rear axles, which amounts to the same in terms of drivability.

The apparatus comprises a closed transmission circuit which includes a pump and hydraulic motors of a group of front motors and of a group of rear motors driving the front and rear displacement members, a first one of the groups of motors comprising at least two motors to which two displacement members situated on either side of the vehicle are respectively coupled, the two motors of said first group of motors being double motors, each having two distinct operating cubic capacities that correspond respectively to first and second elementary motors, the first elementary motor of each of the double motors being connected to the pump in parallel with a motor of the second group of motors, while the second elementary motor is connected in series with said motor of the second group of motors, first and second series ducts thus existing between the second elementary motors of each of the double motors and the second group of motors.

Apparatus of that type is known, e.g. from Documents EP-0 547 947, FR-2 719 001, EP-0 816 153, and EP-1 010 566.

It is known that connecting the second elementary motor in series with the motor of the second group makes it possible to synchronize the wheels that are coupled to those motors, while connecting the first elementary motor in parallel with the motor of the second group makes it possible to obtain output torques from the motors that are equal. Although synchronizing the wheels is advantageous when going straight ahead, it is undesirable when cornering because, in such a situation, the various wheels of the vehicle travel over different distances, as a function of the radii of curvature of their various trajectories.

Thus, for cornering purposes, the above-mentioned documents recommend temporarily interrupting the synchronization by adding valves that make it possible to connect a series duct to the pump in order to short-circuit the second elementary motor (EP-0 816 253) or else connecting the series ducts to the pump while generating flow-rate differences that can be likened to a partially parallel link. In EP-1 010 566, the series ducts are connected to the pump with different pressures, to take account of cornering to right or to left.

In the above-mentioned apparatus, interrupting the synchronization of the wheels to improve the cornering behavior of the vehicle is achieved by means of valves which are controlled by the operator, or else by a system taking account of the angular positions of the steerable drive members, it being possible for that system to be connected directly to a steering member such as a steering wheel or tiller. Such systems can be difficult to install on vehicles, or voluminous, or else fragile under conditions under which vehicles operate on work sites. In addition, such apparatus can be suitable for certain vehicle configurations, and unsuitable for others.

An object of the invention is to improve automatically the behavior of the vehicle in particular driving situations such as cornering or a situation in which ground grip is lost. More precisely, an object of the invention is to retain good drivability for the vehicle, regardless of its steering angle, even when one or two wheels lose their grip, this being achieved fully automatically, i.e. without intentional control from the driver, and without a control system connected to a steering member. Compared with the above-mentioned prior art documents which aim to achieve a comparable result by degrading the synchronization of the displacement members in a situation such as cornering, the invention aims to achieve this result without action from the operator or from the steering members, and for all configurations of vehicle.

This object is achieved with the apparatus of the invention by means of the fact that the series ducts are normally connected to a low-pressure circuit via means for limiting the pressure in the series ducts, and by the fact that it further comprises means for limiting the flow rate of fluid flowing between the series ducts and said low-pressure circuit.

As explained below, the series ducts can be connected continuously to the low-pressure circuit via means for limiting the pressure in said ducts. In a variant, this connection may be achieved via valves each having a plurality of positions, in which case, the rest position of each of the valves, into which it is returned continuously without control from the operator, is the position in which said connection is achieved, it nevertheless being possible for the operator to control said valves in order to modify this situation, e.g. so as to prevent momentarily any connection between the series conducts and the low-pressure circuit, or so as momentarily to cause connection to be established directly between said ducts, enabling the fluid to flow between said ducts and the low-pressure circuit without flowing through said pressure limiter means.

The expression used above, indicating that the series ducts are normally connected to the low-pressure circuit via means for limiting the pressure in said ducts, covers these various possibilities.

For the purpose of simplifying the description, it is considered below that all of the displacement members of the vehicle are wheels. It should however be understood that the invention is also applicable to vehicles having other types of displacement members, e.g., at the front, a single displacement member constituted by the roller of a compactor roller, and, at the rear, two wheels.

During cornering, the various wheels of the vehicle do not travel along the same curves. They must thus cover different distances in order to enable the vehicle to travel, as explained in EP-1 010 566. Thus, the wheel that is coupled to a motor of the first group of motors, and the wheel that is coupled to the motor of the second group connected in series with the second elementary motor of said motor of the first group do not cover the same distance.

In order for the vehicle to keep to its trajectory, one of the wheels must thus turn faster than the other. As a result, the motor of one of the wheels (the one that turns slower) receives or delivers via the series duct a flow of fluid at a rate that is too high compared with the flow rate that the motor of the other wheel ought to be delivering or receiving.

By means of the invention, this excess flow rate can flow away towards the low-pressure circuit. In order to retain drivability for the vehicle, the fluid flow rate that flows away in this way is however limited. In addition, the pressure in the series ducts is limited because the excess pressure can be diverted towards the low-pressure circuit. It is thus possible to prevent limitation applied by the flow-rate limiter means on the excess flow rate towards the low-pressure circuit from being excessive, since that would otherwise lead to excess pressure being generated in the series ducts, adversely affecting the life span of the components.

This provision is particularly advantageous in the event that one of the two wheels that are connected together in series via the series duct between the second elementary motor and the motor of the second group loses its grip. In the event of such loss of grip, the flow rate delivered into the series duct by the motor of the wheel that is spinning can be large, which would give rise to a risk of excess pressure in said duct.

Preferably, for each series duct, the apparatus further comprises means for limiting the flow rate of fluid flowing between the series duct in question and the low-pressure circuit. More precisely, the first and second series ducts are normally (i.e. continuously or when the control valves are in their default (uncontrolled) position) connected to the low-pressure circuit by respective first and second connection ducts, and means for limiting the fluid flow rate are disposed on each of the connection ducts.

With this preferred provision, the flow rate of fluid is limited between the series ducts and the low-pressure circuit, and it is also possible to avoid flow rate transfer that is too large between the two series ducts that are both connected to the low-pressure circuit. However, transfer remains possible via the low-pressure circuit.

In a first advantageous variant, the means for limiting the flow rate of fluid flowing between the series ducts and the low-pressure circuit comprise at least one constriction.

A constriction is an element that is extremely simple for limiting the flow rate between the series duct to which it is connected and the low-pressure circuit.

For example, it is possible to dispose one constriction on each of the two above-mentioned connection ducts.

In a second advantageous variant, the means for limiting the flow rate of fluid flowing between the series ducts and the low-pressure circuit comprise at least one flow-rate regulator.

A simple constriction causes head loss between its two terminals, said head loss increasing proportionally to the square of the flow rate passing through the constriction. It is dimensioned to allow a limited flow rate to pass through it at a given pressure.

Thus, when the operating conditions of the vehicle are such that the pressure increases, the flow rate taken from the series duct also increases. Thus, for the wheel whose motor delivers into the series duct, the constriction tends to allow slip, which increases with increasing pressure.

Conversely, when a flow-rate regulator is used, said regulator passes the fluid with almost no drop in pressure so long as the flow rate passing through it does not reach a saturation value to which it is set. When the saturation value is reached, the flow rate passing through the regulator remains substantially fixed at said saturation value, and, starting from this situation, regardless of the pressure in the series duct, the wheel whose motor delivers into said duct is allowed to slip only by a limited amount corresponding to said flow rate.

For example, it is advantageous to dispose a flow-rate regulator on each of the two above-mentioned connection ducts. In which case, so long as the fluid pressure in the series ducts has not reached the value generating the saturation value of the regulators, equilibrium exists between the two series ducts, the fluid flowing substantially freely between them. Conversely, once the pressure in one of the series ducts has reached said saturation value, the flow rate passing through the regulator that is associated with said duct remains substantially fixed at the saturation value, and the pressures in the two connection ducts, and thus in the two series ducts, vary differently from one another.

Advantageously, the series ducts are normally connected to the low-pressure circuit via a rated valve.

The valve is rated for a certain pressure, i.e. it allows flow rate to be transferred between the series duct and the low-pressure circuit only once the pressure in the ducts has reached a given value.

It is possible to use one rated valve for each series duct, or else to use a single rated valve for both of the ducts, disposed on a common duct segment connecting the two above-mentioned connection ducts to the low-pressure circuit.

Advantageously, the apparatus further comprises a common duct segment connecting the two connection ducts to the low-pressure circuit, and additional means for limiting the flow rate and/or the pressure are disposed on said common duct segment.

The additional means for limiting the flow rate and/or the pressure may be constituted by the above-mentioned rated valve. They may also comprise a simple constriction disposed on the common duct segment, or else a flow-rate regulator disposed on the segment.

Rather than comprising a rated valve, they may comprise a valve controlled by the pressure difference between the common duct segment and that one of the orifices of the pump of the closed circuit which is at the higher pressure.

The existence of such a common duct segment makes it possible for fluid to be transferred between the series duct via the connection ducts (the fluid transfer optionally being limited by the constrictions or regulators disposed on said ducts) which are united by being connected to the common duct segment.

Advantageously, the apparatus further comprises a flow-rate divider which connects the pump to the first elementary motors via two parallel ducts connected to respective ones of said motors.

In which case, advantageously, the two parallel ducts are connected together via a connection segment equipped with means for limiting the flow rate of fluid between said parallel ducts.

A flow-rate divider makes it possible to avoid situations of spinning between two wheels on the same axle, by distributing the fluid flow rate between the first elementary motors of said two wheels on the same axle, even if one of them is spinning.

The existence of a connection segment equipped with means for limiting the flow rate of fluid between the parallel ducts makes it possible to transfer flow rate between said parallel ducts in a proportion determined by said means in order to limit the flow rate. This makes it possible to "degrade" operation of the flow-rate divider slightly in order to prevent any small differences in cubic capacity between the motors equipping the two wheels on the same axis, or in inflation of tires on said wheels, from adversely affecting proper operation of the vehicle. The flow-rate transfer taking place via said connection segment also makes it possible to supplement the main means of the invention so as to direct the small extra flow rate that is necessary to that one of the first elementary motors of the same axle which is turning faster during cornering.

In a variant, the low-pressure circuit is a booster circuit fed via a booster pump.

The booster pump that is usually used to avoid cavitation in the motors, thus also serves to feed the low-pressure circuit.

In another variant, the low-pressure circuit includes a low-pressure feed duct connected to the low pressure of the pump via a low-pressure selector connected to the two orifices of the pump.

As explained below, this other variant is particularly advantageous for enabling the vehicle to operate properly both in the forward direction and in the reverse direction.

In a variant, the series ducts are connected to the low-pressure circuit via a synchronization selector suitable, in its rest position, for actually putting the series ducts into communication with the low-pressure circuit and for being caused to go into an active position in which said selector prevents fluid from flowing from the series ducts towards the low-pressure circuit.

In a variant, the series ducts are connected to the low-pressure circuit via a short-circuit selector suitable for being caused to go into an active position in which said selector establishes direct communication between the series ducts and the low-pressure circuit, starting from its rest position in which it prevents said direct communication.

Advantageously, the means for limiting the pressure in the series ducts and the means for limiting the flow rate of fluid flowing between the series ducts and the low-pressure circuit, and, when they are present, the synchronization selector and/or the short-circuit selector, are grouped together in a valve unit.

Such a valve unit can be manipulated as a whole and can be flange-mounted or fixed in some other way onto one of the motors, or else onto the body of the pump, or onto any other support.

The invention will be better understood and its advantages will appear more clearly on reading the following detailed description of an embodiment shown by way of non-limiting example. The description refers to the accompanying drawings, in which.

Figure 1:
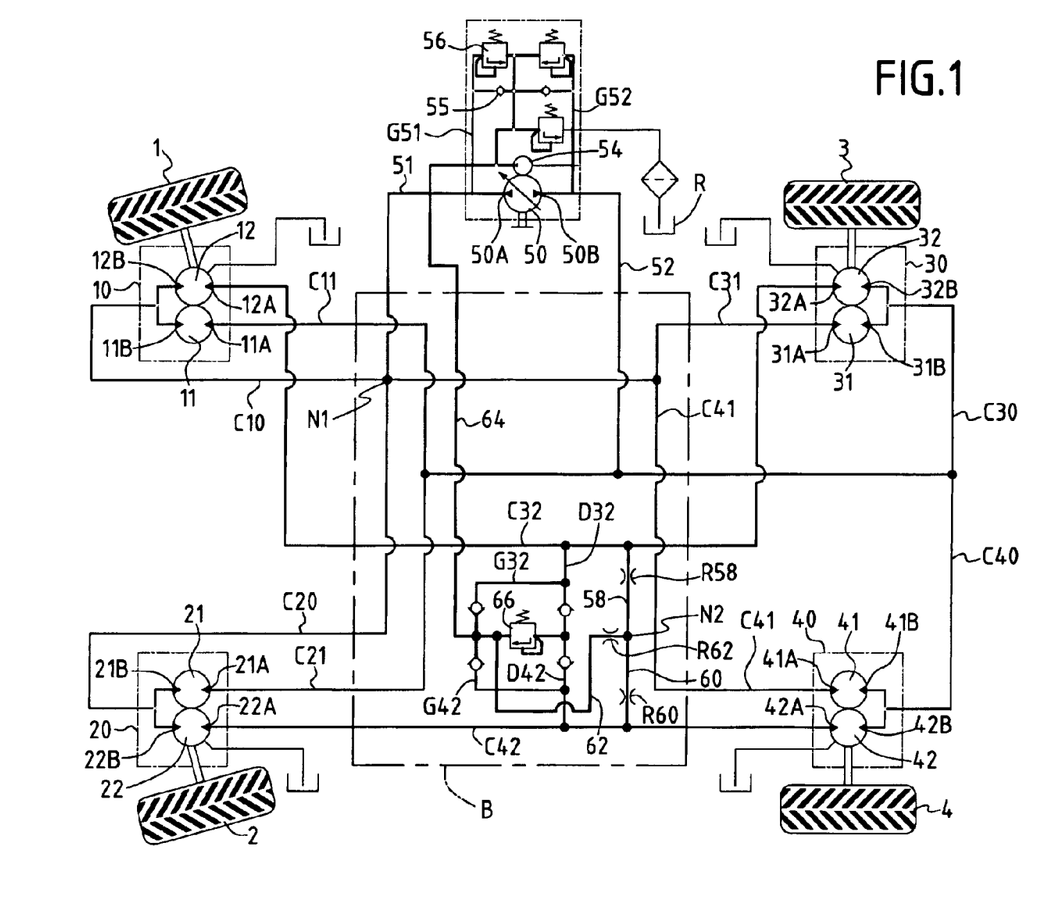
FIG. 1 diagrammatically shows apparatus of the invention in a first variant embodiment.

The vehicle of FIG. 1 comprises four driving wheels, the wheels 1 and 2 on one axle being steerable, while the wheels 3 and 4 on the other axle are not steerable. Depending on the type of vehicle, the steerable-wheel axle may be the front axle or the rear axle.

Each of the wheels 1 to 4 is a driving wheel and is coupled to a respective hydraulic motor 10, 20, 30, 40. The transmission circuit is a closed circuit and includes a variable flow rate pump 50 having two orifices, respectively 50A and 50B.

In the variant shown in FIG. 1, all four motors are double motors. Each of them is made up of first and second elementary motors, respectively 11 & 12, 21 & 22, 31 & 32, and 41 & 42.

It is considered that the motors 30 and 40 are motors of the first group. The first elementary motors 31 and 41 of said motors 30 and 40 are connected to the pump 50 in parallel with the motors 10 and 20. The second elementary motors 32 and 42 are connected in series with respective ones of the motors 10 and 20.

Each elementary motor has a first orifice designated by the reference of the elementary motor in question followed by the letter A, and a second orifice designated by the same reference followed by the letter B. Depending on the direction in which the pump is operating, said orifices serve as the feed or as the discharge of the elementary motor in question. In the example shown, the motors 10 to 40 are "three-hole" motors, i.e. the respective first orifices (followed by the letter A) of their elementary motors are separate and thus form two first main orifices of the double motor, while the second orifices (followed by the letter B) of the elementary motors are grouped together to form a third main orifice of the double motor. Depending on the feed direction of the motor, the first main orifices and the third main orifice serve for feed or for discharge.

For example, it is considered that the orifices 50A and 50B of the pump 50 serve respectively for feeding and for discharge. Thus, the feed duct 51 connected to the orifice 50A feeds the motors 10 and 20 in parallel via the second orifices 11B, 12B, 21B, and 22B of their respective elementary motors, and also feed the first elementary motors 31 and 41 of the motors 30 and 40 via their first orifices, respectively 31A and 41A. From a node N1, the duct 51 subdivides into parallel ducts connected to respective ones of the various motors, and respectively designated by the references C10, C20, C31, and C41.

For discharge purposes, the elementary motors 11 and 21 of the double motors 10 and 20 are connected in parallel, respectively via the ducts C11 and C21, to the discharge duct 52 which is connected to the orifice 50B of the pump. Similarly, the double motors 30 and 40 are connected in parallel, via ducts C30 and C40, to the same discharge duct.

The two elementary motors 32 and 42 of the double motors 30 and 40 are fed by being connected to the discharge orifices 12A and 22A of the elementary motors 12 and 22, via series ducts, respectively C32 and C42.

Since all four motors of the apparatus of FIG. 1 are "three-hole" double motors, and since the circuit is symmetrical from the point of view of the feed and the discharge of the motors on both axles, it is also possible to consider that, in the sense given by the introductory portion of the present description, the motors 10 and 20 constitute the motors of the first group, whose first elementary motors 11 and 21 are connected to the pump in parallel with the motors 30 and 40, and whose second elementary motors 12 and 22 are connected in series with the elementary motors 32 and 42.

In a manner known per se, the apparatus shown in FIG. 1 includes a booster circuit including a booster pump 54 which, via check valves 55 and pressure limiters 56, can feed the ducts 51 or 52 with fluid via ducts G51 and G52 to avoid cavitation in the motors.

In the first variant of the invention, the low-pressure circuit to which the series ducts C32 and C42 are connected for removing the surplus flow rate from said ducts during cornering is the booster circuit. In order to connect said series ducts to the booster circuit, two connection ducts are provided, respectively 58 for the duct C32 and 60 for the duct C42. They are united at a node N2 from which a common duct segment 62 extends that is connected to a booster connection duct 64 for connection to the booster.

In the variant shown in FIG. 1, the means of the invention for limiting the flow rate of fluid flowing between the series ducts and the low-pressure circuit constituted by the booster circuit comprise constrictions. More precisely, constrictions R58 and R60 are disposed on respective ones of the connection ducts 58 and 60, and a constriction R62 is disposed on the common duct segment 62.

It is possible to provide fewer constrictions, e.g. by omitting the constriction R62. However, in order to limit sufficiently the flow rate of fluid flowing between the series ducts and the low-pressure circuit, it would then be necessary to choose constrictions R58 and R60 of very small through section. Very small constrictions are more costly to manufacture and, in addition, they can clog up if the fluid conveys impurities. That is why it is preferred to use constrictions R58 and R60 that have reasonably small through sections, corresponding, for example, to diameters of 0.5 millimeters (mm), and a constriction R62 also having a reasonably small flow section, e.g. having a diameter of 0.8 mm. In addition, the existence of constrictions generating low head loss on the connection ducts 58 and 60 makes it possible to transfer fluid between the series ducts C32 and C42 so as thereby to facilitate delivering fluid to the motors that drive those of the displacement members which, e.g. during cornering, have to travel over distances longer than the distances traveled by the others. The constriction R62 is disposed on the common duct segment so as to generate the desired head loss between the node N2 and the low-pressure circuit.

In the first variant of the invention, a pressure limiter 66 is also used to limit the pressure in the series ducts C32 and C42. The pressure limiter is disposed between the series ducts and the booster connection duct 64. Its inlet is connected to the series ducts via branches, respectively D32 and D42, disposed in parallel with the connection ducts 58 and 60, and each equipped with a check valve making it possible for fluid to flow only in the direction going from the series duct in question to the pressure limiter 66. Like the common duct segment 62, the outlet of the pressure limiter 66 is connected to the duct 64. For example, the pressure limiter is rated to the rated pressure of the pump 50, or to higher, within the pressure limits authorized by the manufacturer of the motors, i.e. approximately in the range 350 bars to 450 bars. It prevents the fluid pressure in the series ducts from becoming higher than said rated pressure, and from damaging the components.

In the example shown in FIG. 1, the low-pressure circuit is a booster circuit, and the booster pump 54 also serves, via the booster connection duct 64, to boost the series ducts C32 and C42 in order to avoid cavitation of the motors connected to said ducts, e.g. during cornering in the reverse direction, when the motor of a steerable wheel calls for a flow rate in the series duct that is higher than the flow rate delivered by the motor of the non-steerable wheel. For this purpose, two booster branches, respectively G32 and G42 are disposed between the booster connection duct 64, and respective ones of the series ducts C32 and C42. Conventionally, the booster branches are provided with check valves making it possible for fluid to flow only in the direction going from the booster towards the series ducts it is also possible to choose to boost the motors in some other way.

It is also possible to choose to use merely a return to a fluid reservoir R that is pressure-free or more exactly at atmospheric pressure as a low-pressure circuit to which the series ducts are connected. For this purpose, the duct 64 could be connected directly to the reservoir R.

It is indicated above that it is advantageous to transfer fluid between the series ducts, by choosing the constrictions R58 and R60 with reasonably small through sections. It is even possible to choose not to dispose constrictions on the connection ducts 58 and 60, and to limit the flow rate of fluid between the series ducts and the low-pressure circuit via one or more constrictions disposed on the common duct segment 62.

It is possible not to choose a common duct segment, and to connect each of the ducts 58 and 60, equipped with their respective constrictions R58 and R60, directly to the duct 64.

The apparatus shown in FIG. 1 includes a pressure limiter arrangement that is common to the series ducts C32 and C42 and that, in this example, is constituted by the pressure limiter 66.

Figure 2:
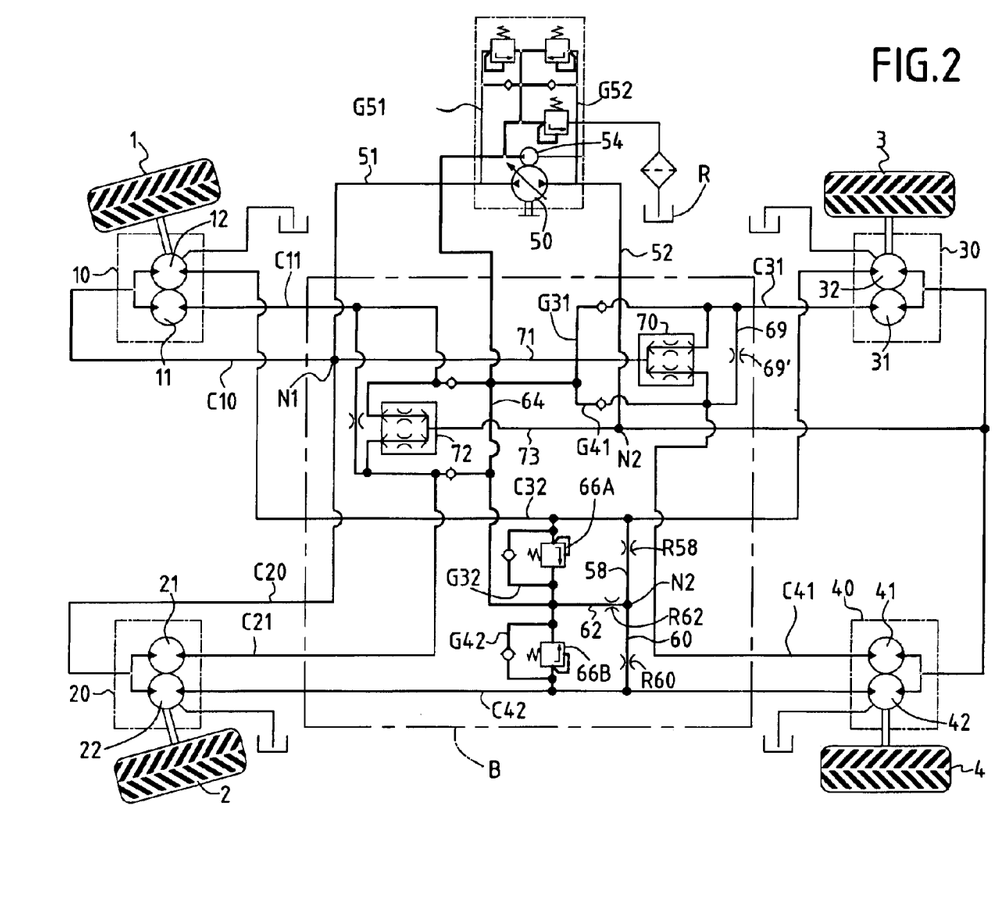
FIGS. 2 to 7 are views analogous to the views in FIG. 1 for other variants.

FIG. 2 shows that a pressure limiter arrangement is provided for each of the series ducts. A description follows of FIG. 2, in which the elements unchanged relative to FIG. 1 are given unchanged references.

In order to limit the pressure in the series duct C32, a pressure limiter 66A is disposed between said duct and the common duct segment 62, which is connected to the booster connection duct 64. In order to limit the pressure in the series duct C42, a second pressure limiter 66B is disposed between said duct C42 and the common duct segment 62.

As shown in FIG. 1, the low-pressure circuit is a booster circuit, and the motors connected to the series ducts can be boosted by booster branches, respectively G32 and G42, by-passing respective ones of the pressure limiters 66A and 66B.

It is also quite possible to design apparatus that differs from the apparatus shown in FIG. 1 merely by the above-described configurations of the pressure limiters 66A, 66B.

As in the apparatus shown in FIG. 1, such a apparatus makes it possible for a continuous connection to be established between the series ducts C32 and C42 with constrictions that make it possible during cornering to provide a small flow rate transfer between the two sides of the vehicle towards the low-pressure circuit.

However, the apparatus of FIG. 2 differs from the apparatus of FIG. 1 in that it further includes two flow-rate dividers, respectively referenced 70 and 72.

The flow-rate divider 70 is disposed at the connection node between firstly the parallel ducts C31 and C41 and secondly the main duct 51, or, more precisely, a division duct segment 71 connected to the duct 51 at the node N1. Thus, the fluid flow rate delivered via the orifice 50A of the pump 50 is distributed between the ducts C31 and C41 by the divider. If the motors 31 and 41 have the same cubic capacity, and if the conditions under which the wheels 3 and 4 are driven are the same, the flow rate is divided equally between the two parallel ducts C31 and C41.

In order to compensate for any differences in behavior between the wheels 3 and 4 and/or the motors 30 and 40, the flow-rate divider 70 may be degraded by a connection segment 69 equipped with a constriction 69'. The constriction may be replaced with a flow-rate regulator which, so long as the flow-rate has not reached the regulated value, generates almost no head loss between its inlet and its outlet. In which case, the regulator has both-way flow, i.e. two operating directions, for regulating the flow rate in both directions between the parallel ducts between which the connection segment extends.

FIG. 2 also shows that the booster branches G31 and G41 are disposed between the booster connection duct 64 and the parallel ducts C31 and C41. If, for example, the motors 10 and 11 were motors having single cubic capacities, or if the wheels 1 and 2 were replaced by a single displacement member driven by a single motor having two cubic capacities forming two elementary motors, then only the first elementary motors 31 and 41 of the first group, which are fed in parallel with the motors of the second group, would be fed via the flow rate divider 70. It is known that the existence of the flow rate divider makes it possible, if one of the wheels 3 and 4 spins, to prevent all of the flow rate flowing in the duct 71 from being consumed by the motor driving said wheel. Thus, that one of the wheels which is not spinning continues to provide drive.

In the example shown in FIG. 2, the motors 10 and 12 are also double motors and the flow rate divider 72, in the same travel direction as above, unites the fluid flow rates from the parallel ducts C11 and C21 in the duct 52 (via the division duct 73 which is connected to the duct 52 at the node N2). The flow rate divider 72 operates analogously to the divider 70 in the reverse travel direction. Like that divider, it can have its operation degraded by means of a connection segment, extending between the two parallel ducts C11 and C21, and equipped with means for limiting the flow rate of the fluid between said parallel ducts.

By means of the invention, because the series ducts are connected to the low-pressure circuit, only two flow-rate dividers, one per axle, suffice to continue to enable the vehicle to remain drivable even when two wheels are in a situation in which they have lost their grip, whether they are two wheels on the same axle, or two wheels disposed diagonally opposite from each other.

Figure 3:
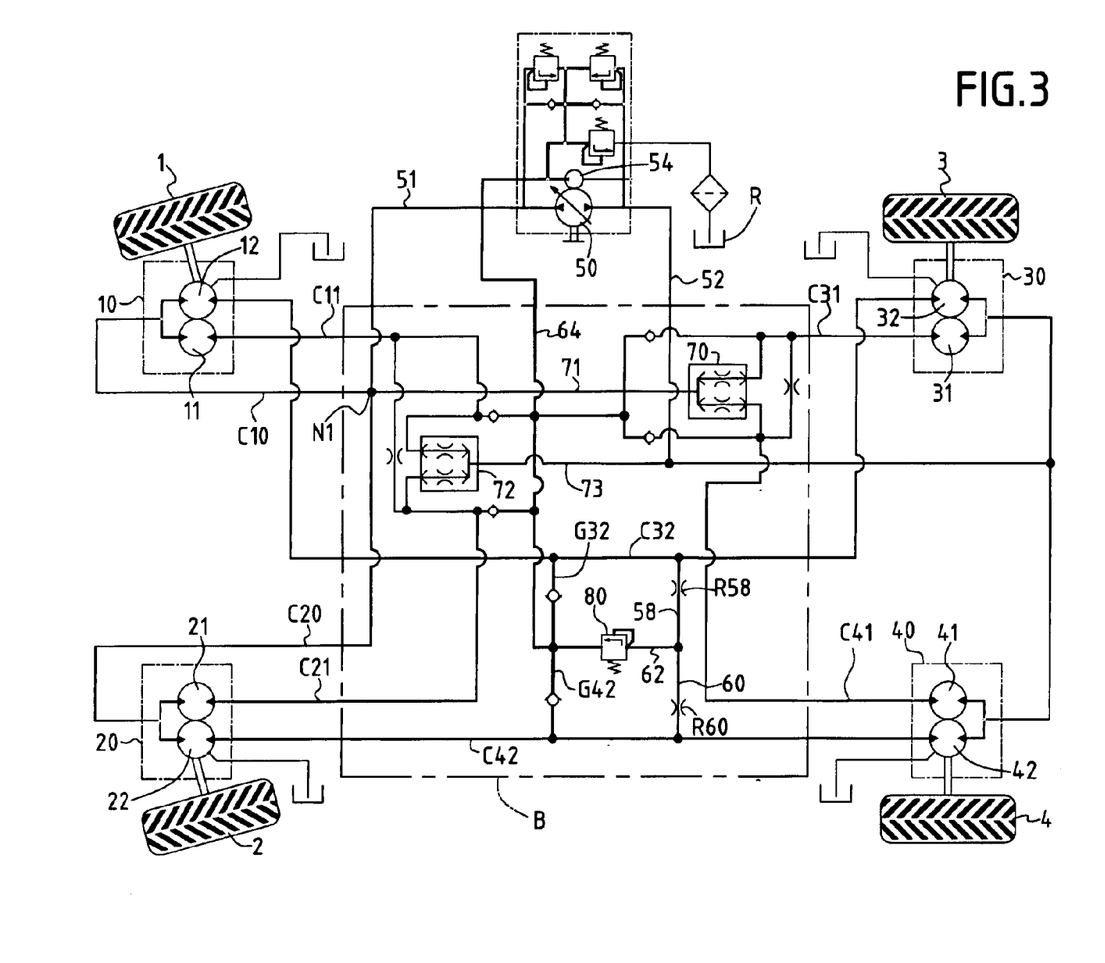

As shown in FIG. 3, the series ducts C32 and C42 are connected to the low-pressure circuit via a rated valve 80.

In this example, said valve is disposed between the common duct segment 62 and the booster connection duct 64. Disposed in this way, said valve also acts as a pressure limiter for the series ducts C32 and C42. Its section can be limited so that, when it is open, it enables it to acts as a flow rate limiter like the constriction R62 in FIG. 1.

Booster branches G32 and G42 are disposed between the duct 64 and the series ducts C32 and C42. As in FIG. 2, the booster branches can be disposed in parallel with pressure limiters of the same type as the limiters 66A and 66B.

The valve 80 allows the flow rate to be removed from the series ducts towards the booster connection duct 64 only once the pressure in the common duct segment 62 has reached a threshold value corresponding to its rating. Because of the presence of the constrictions R58 and R60, said threshold rating value is lower than the rated pressure of the pump 50, and is, for example about 250 bars.

Because of the presence of the valve 80, the presence of pressure limiters of the same type as the limiters 66A and 66B is not always necessary. It may be necessary if it is desired for maximum safety to be ensured, and if, for example, it is desired to avoid the risks that any blocking off of one of the constrictions R58 and R60 might give rise to extra pressure in the series ducts.

Figure 4:
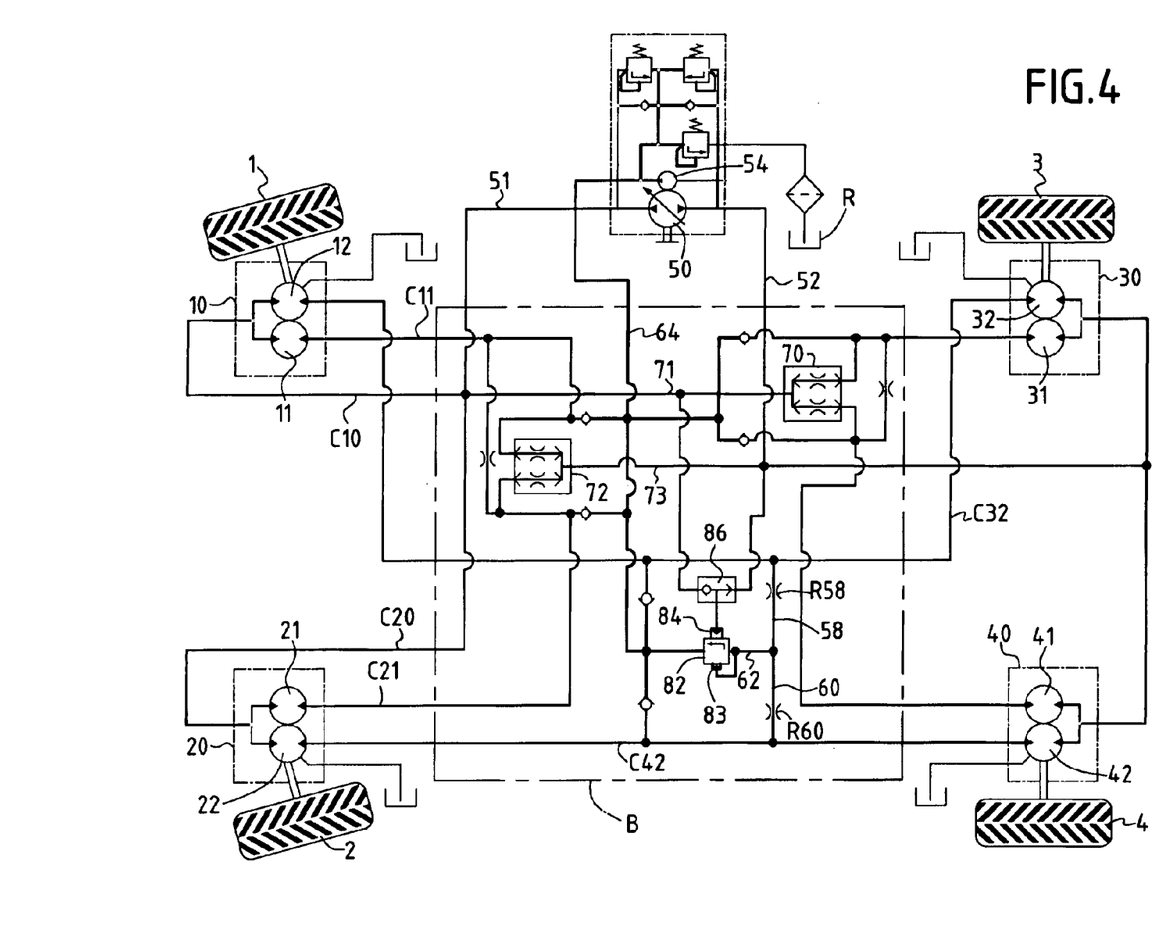

The variant shown in FIG. 4 differs from the variant shown in FIG. 3 in that the rated valve 80 is replaced by a valve 82 which is controlled by the pressure difference between the common duct segment 62 and one of the orifices of the pump 50, and which is interposed between the common duct segment 62 and the low-pressure circuit. In fact, like the valve 80, the valve 82 is disposed between the common duct segment 62 and the duct 64.

More precisely, the valve 82 is subjected to the pressure in the common duct segment 62 via a first control chamber 83 which is connected to said segment, and it is subjected to the high pressure from the pump 50 via a second control chamber 84. The control chambers have opposing effects, i.e. the increase in the pressure in one of them has an effect contrary to the pressure being increased in the other. The second chamber 84 is connected to one of the orifices 50A and 50B of the pump via a shuttle valve 86 which selects the higher of the pressures at said orifices. The two inlet terminals of the valve are connected to the ducts 51 and 52, while its outlet terminal is connected to the chamber 84.

The designs of the control chambers 83 and 84 are such that the valve 82 opens when the ratio between the pressure in the common duct segment 62 and the pressure in that one of the ducts 51 and 52 which is connected to the higher pressure reaches a given value. In addition, because of the presence of the constrictions R58 and R60 that give rise to head loss, it is possible, for example, to define the chambers 83 and 84 so that the valve 82 opens so as to maintain the pressure in the series ducts in the vicinity of one half of the pressure in that one of the ducts 51 and 52 which is at the high pressure, thereby making it possible to distribute the traction force equally between the wheels on the same side of the vehicle.

Figure 5:
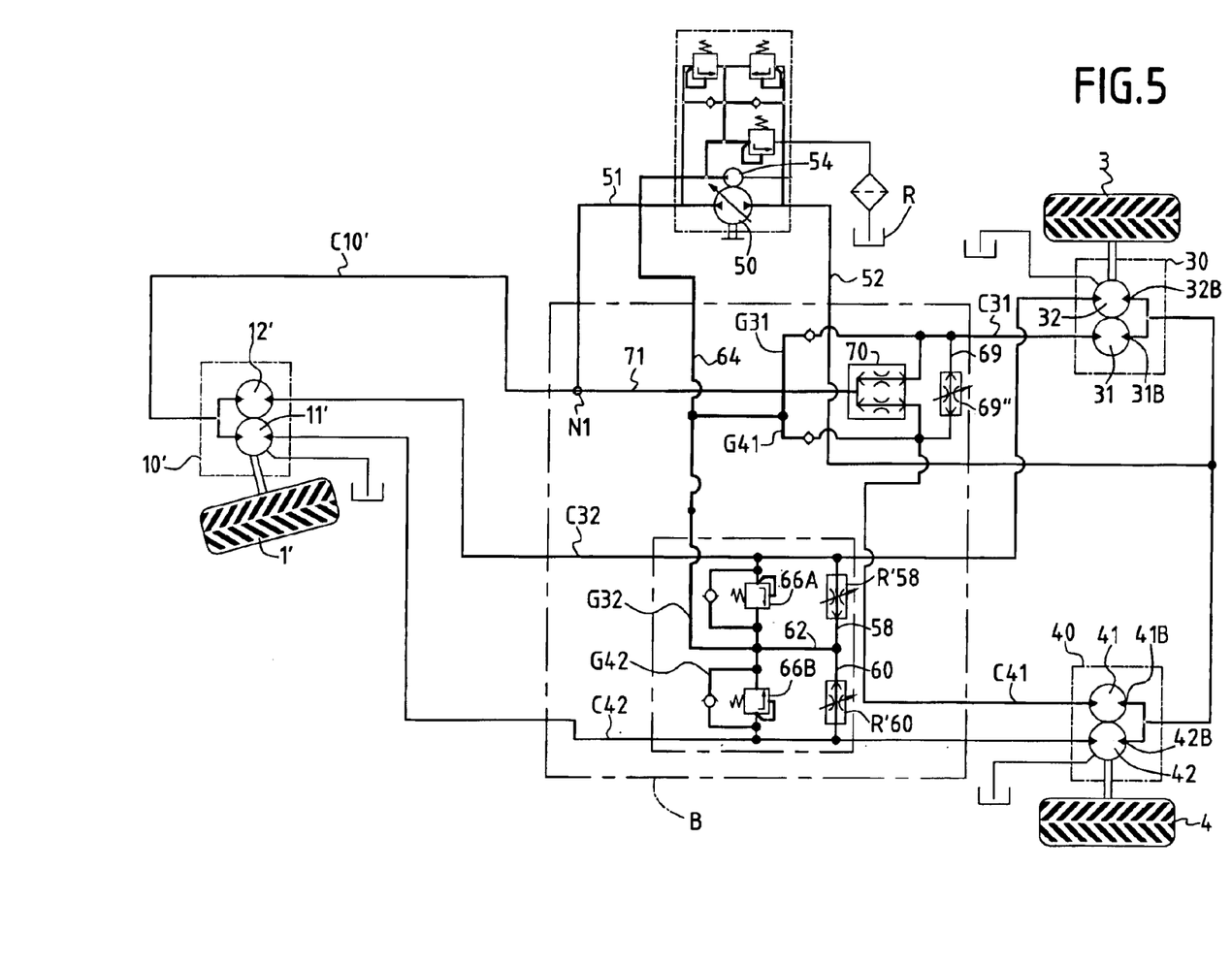

FIG. 5 shows a variant in which the motors 30 and 40 are double motors coupled to two wheels, respectively 3 and 4. The other axle has a single displacement member 1' only, e.g. a wheel or the front roller of a compactor roller, driven by a double motor 10'. The double motor is made up of two elementary motors, respectively 12' and 11'. It should be noted that the circuit shown in FIG. 5 could be identical if the double motor 10' were replaced with two motors, corresponding to respective ones of the elementary motors 11' and 12', and each driving a respective wheel.

The duct 51 subdivides as from a node N1 into a duct C10' for feeding the motor 10' and into parallel ducts C31 and C41 (optionally with the flow rate divider 70 being interposed, connected to the duct 51 via the division duct 71). The elementary motors 31 and 41 connected to respective ones of the ducts C21 and C41, are thus fed in parallel with the motor 10'.

The second elementary motors 32 and 42 are connected in series with respective ones of the elementary motors 12' and 11', via respective series ducts C32 and C42. The common orifices 31B, 32B of the elementary motors 31 and 32, and the common orifices 41B, 42B of the elementary motors 41 and 42, which form respective ones of the third orifices of the motors 30 and 40, are connected to the duct 52.

Thus, if the duct 51 serves as the feed in the preferred travel direction of the vehicle, the motors 32 and 42 are fed by the fluid delivered by the elementary motors 12' and 11'. The situation is inverted when the pump is in its other operating direction.

As in the preceding diagrams, the connection ducts 58 and 60 are present, equipped with means for limiting the fluid flow rate between the series ducts C32 and C42 and the low-pressure circuit, e.g. a booster circuit.

In the example shown, said means are constituted by one-way or both-way flow-rate regulators R'58 and R'60. A constriction or a flow-rate regulator can optionally be disposed on the common duct segment 62, which does not apply to the example shown. As in FIG. 2, pressure limiters 66A and 66B are disposed between the common duct segment 62 and respective ones of the series ducts C32 and C42. The booster branches G32 and G42 are also present.

It should also be noted that, in the example shown in FIG. 5, it is a both-way flow-rate regulator 69" that is disposed on the connection segment 69. The elementary motors 31 and 41 are boosted by booster branches, respectively G31 and G41, connected to the booster connection duct 64, in addition to the boosting provided by the ducts G51 and G52 connected to the ducts 51 and 52.

FIG. 5 thus applies to the hydrostatic transmission of a three-wheel vehicle, whose isolated wheel is driven by a double motor, or else to the hydrostatic transmission of a four-wheel vehicle, in which two wheels are driven, each by a single motor, or else by a motor having a plurality of cubic capacities, all of which are fed properly in parallel.

In such a case, a single flow rate divider 70 suffices to avoid the risks of spinning in the event that two wheels on the same side lose their grip.

Figure 6:
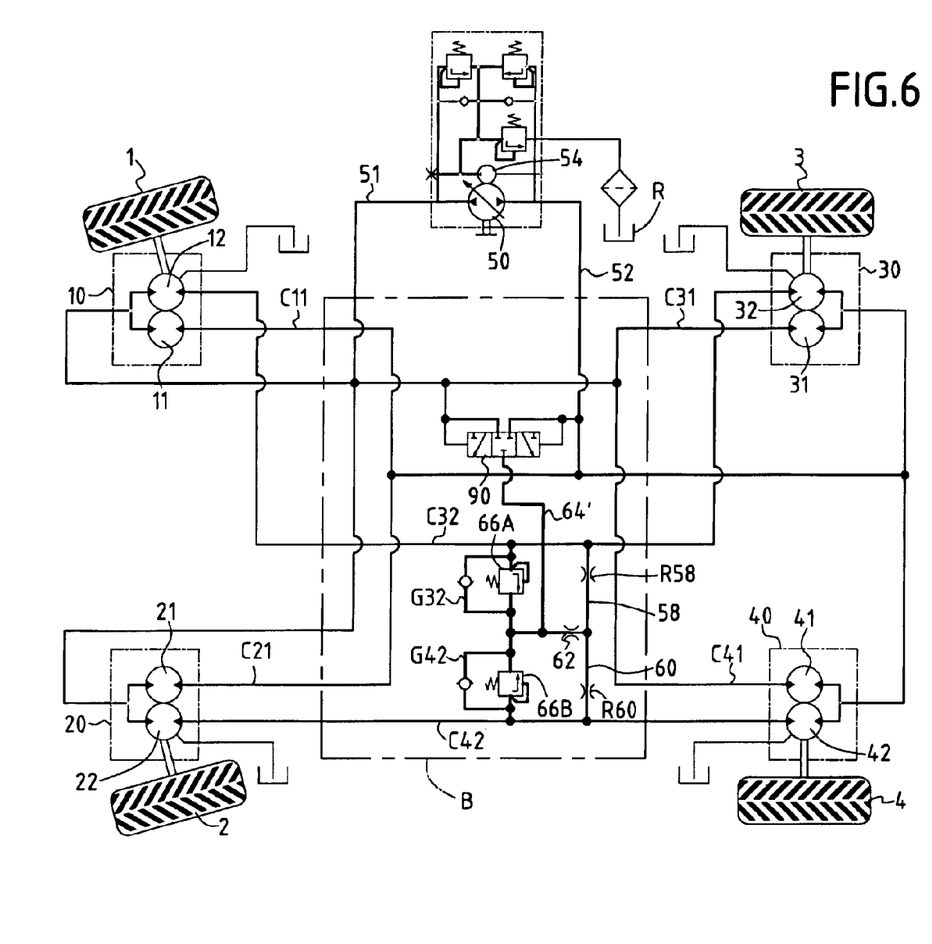

FIG. 6 shows a variant that is substantially analogous to the variant of FIG. 1, except that the pressure limiter 66 of FIG. 6 is replaced with the two pressure limiters 66A and 66B in FIG. 2.

The other important difference between the variant in FIG. 6 and the variant in the preceding figures lies in the fact that the low-pressure circuit is not the booster circuit. The low-pressure circuit includes a low-pressure duct 64' which is connected to the low pressure of the pump 50 via a low-pressure selector 90. Said selector has three ports connected respectively to the ducts 51 and 52 and to the duct 64'. The selector is capable of taking up at least two positions, by being controlled by the pressure that prevails in the ducts 51 and 52, so as to put that one of said ducts which is at the lower pressure into communication with the low-pressure feed duct 64'. In the example shown, said selector is also capable of taking up a third position in which it isolates its three ports from one another when the pressures in said ducts are equal.

Compared with the low-pressure circuit of the preceding figures, the low-pressure circuit of FIG. 6 offers an advantage when the vehicle is operating in the reverse direction, in which situation the series ducts C32 and C42 doe not serve to feed the elementary motors 31 and 41 with fluid, but rather to deliver the fluid being discharged from said motors. In the circuits of FIGS. 1 to 5, in such a case, during cornering, the fluid flow rate in the series ducts becomes insufficient and is supplemented by the booster fluid coming from the booster pump 50. Thus, the return flow rate of the pump 50 becomes higher than its delivery flow rate, and the pressure is increased. In the situation shown in FIG. 6, the series ducts are connected to that one of the ducts 51 and 52 which is at the lower pressure, regardless of the travel direction of the vehicle, without increasing the flow rate of return to the pump. It should be noted that the steerable displacement members are not necessarily the front displacement members.

Figure 7:
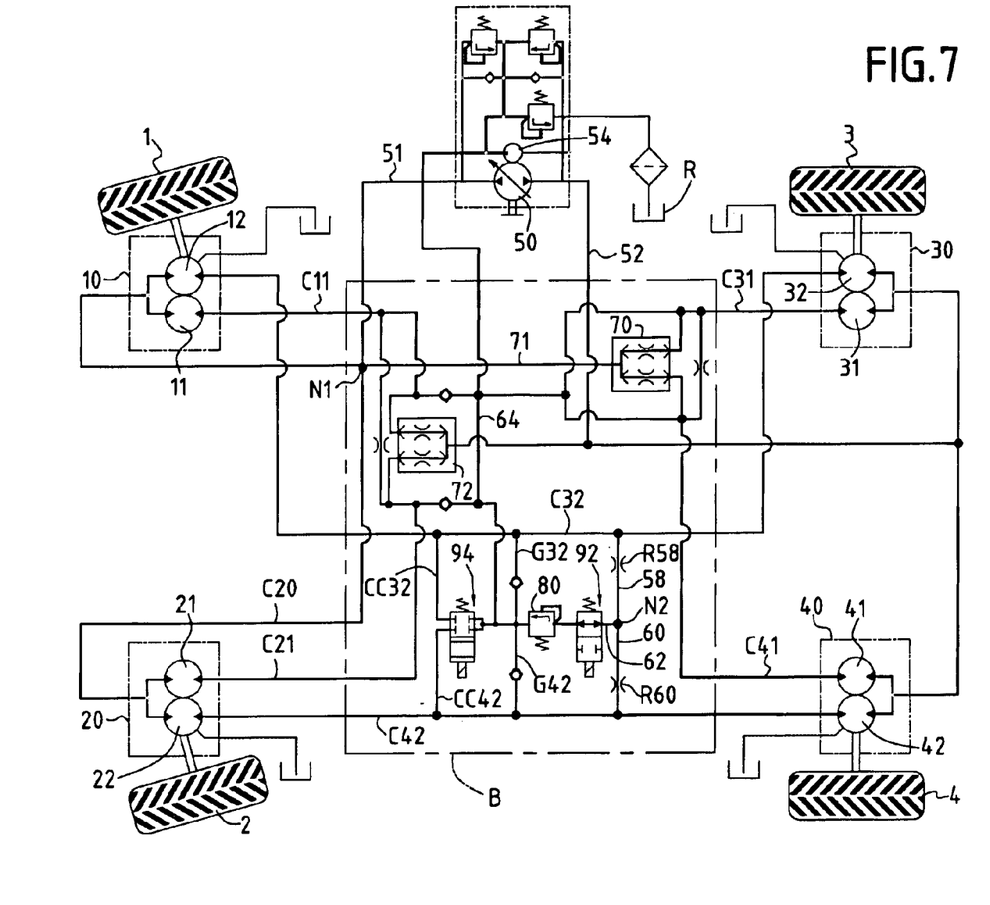

The variant shown in FIG. 7 is close to the variant of FIG. 3. It also uses a rated valve 80 disposed between the common duct segment 62 and the booster connection duct 64.

In FIG. 7, a two-position selector 92, referred to as the "synchronization selector", is interposed between the node N2 and the valve 80. In its rest position (into which it is returned by a spring) shown in FIG. 7, said selector puts the valve 80 into communication with the node N2, its two ports being connected to the duct 62 and communicating with each other. In this situation, the apparatus operates analogously to the apparatus of FIG. 3.

The selector 92 may be controlled, e.g. by an electrical control, so as to take up an activated position in which it prevents communication from being established between the node N2 and the valve 80. In this situation, the series ducts C32 and C42 cease to be connected to the low-pressure circuit constituted by the booster circuit.

The surplus fluid flow rate flowing in the series ducts 32 or 42, e.g. during cornering, is thus prevented from being transferred to the low-pressure circuit. In other words, slip is prevented between the wheels whose motors are fed in series by said series ducts, but rather said wheels are synchronized exactly by making it possible for maximum torque transfer to take place between the motors connected together via a series duct.

The "normal" situation, obtained by default when the selector 92 is in the rest position, remains the situation in which the series ducts are interconnected but, for example, if the wheels of the vehicle start to spin, the user can momentarily avoid the slip that normally occurs in this situation by controlling the selector 92 so as to synchronize those wheels whose motors are interconnected via a series duct, and so as very rapidly to remedy the spinning without slip.

Rather than one selector 92 placed on the duct 62, it is possible to use two analogous selectors disposed on respective ones of the ducts 58 and 60 for separately dealing with spinning involving a wheel on the left side or with spinning involving a wheel on the right side of the vehicle.

The variant of FIG. 7 also includes a selector 94 which is disposed between the series ducts C32 and C42 and the low-pressure circuit. More precisely, said selector 94, that is referred to as the "short-circuit selector" is connected firstly to the connection duct 64 for connection to the low-pressure circuit, and secondly to each of the ducts C32 and C42, respectively via first and second short-circuit ducts, CC32 and CC42.

In its rest position (into which it is continuously returned by a spring) shown in FIG. 7, the selector 94 isolates the ducts CC32 and CC42 from the duct 64 and the apparatus thus operates like the apparatus of FIG. 3 (subject to the control of the selector 92, given that the selectors 92 and 94 can optionally coexist in the same apparatus).

The selector 94 can be controlled, e.g. by an electrical control, so as to take up its activated position in which it connects the ducts CC32 and CC42 to the duct 64. The fluid can then flow between the series ducts C32 and C42, and the low-pressure circuit without flowing through the constrictions R58 and R60 in the connection ducts 58 and 60. This situation, in which the wheels whose motors are interconnected via the series ducts are not synchronized and in which there is no torque transfer between said motors, is particularly well suited to driving at high speed on a surface offering good grip, such as a road.

The various valves described with reference to FIGS. 1 to 7 are advantageously grouped together in a single valve unit manipulated as a whole and that can, for example, be flange-mounted on the pump. Said valves include the constrictions or the flow-rate regulators, the pressure limiters, the valves 80 and 82, or else the flow-rate dividers 70 and 72 as well as, in the case of FIG. 6, the selector 90, or in the case of FIG. 7, the selector 92 and/or the selector 94. In the figures, the set into which the valves are integrated is indicated in chain-dashed lines and designated by the letter B.

The circuits shown in FIGS. 1 to 7 can include a system for replenishing and flushing of the casings of the motors. For example, said system comprises a single tapping and discharge valve connected to a main duct which is the duct that constitutes the discharge duct in the preferred travel direction of the vehicle, corresponding to the preferred operating direction of the motors. In another example, it can include a valve grouping together a replenishing selector connected to the two ducts 51 and 52 selecting that one of them which was the lower-pressure, and a valve for removing fluid towards a pressure-free reservoir.

What is claimed is:

1. Hydrostatic transmission apparatus for a vehicle having a group of front displacement members and a group of rear displacement members, the displacement members of one of said groups being steerable relative to the displacement member(s) of the other group, the apparatus comprising a closed transmission circuit which includes a pump and hydraulic motors of a group of front motors and of a group of rear motors driving the front and rear displacement members, a first one of the groups of motors comprising at least two motors to which two displacement members situated on either side of the vehicle are respectively coupled, the two motors of said first group of motors being double motors, each having two distinct operating cubic capacities that correspond respectively to first and second elementary motors, the first elementary motor of each of the double motors being connected to the pump in parallel with a motor of the second group of motors, while the second elementary motor is connected in series with said motor of the second group of motors, first and second series ducts thus existing between the second elementary motors of each of the double motors and the second group of motors, said series ducts being normally connected to a low-pressure circuit via means for limiting the pressure in the series ducts, and the apparatus further comprising means for limiting a flow rate of fluid flowing between the series ducts end said low-pressure circuit.

2. Apparatus according to claim 1, wherein the series ducts are connected to the low-pressure circuit via a connection chosen in the group including a continuous connection and a connection via at least one valve having a rest position enabling said connection.

3. Apparatus according to claim 1, wherein the first and second series ducts are respectively normally connected to the low-pressure circuit by respective first and second connection ducts, means for limiting the fluid flow rate being disposed on each of the connection ducts.

4. Apparatus according to claim 1, wherein the means for limiting the pressure in the series ducts comprise a pressure limiter arrangement that is common to said ducts.

5. Apparatus according to claim 1, wherein the means for limiting the pressure in the series ducts comprise one pressure limiter arrangement for each of said ducts.

6. Apparatus according to claim 1, wherein the means for limiting the flow rate of fluid flowing between the series ducts and the low-pressure circuit comprise at least one constriction.

7. Apparatus according to claim 1, wherein the means for limiting the flow rate of fluid flowing between the series ducts and the low-pressure circuit comprise at least one flow-rate regulator.

8. Apparatus according to claim 1, wherein the series ducts are connected to the low-pressure circuit via a rated valve.

9. Apparatus according to claim 3, further comprising a common duct segment connecting the two connection ducts to the low-pressure circuit, wherein additional means for limiting the flow rate and/or the pressure are disposed on said common duct segment.

10. Apparatus according to claim 1, wherein the first and second series ducts are respectively normally connected to the low-pressure circuit via respective first and second connection ducts which are connected to said low-pressure circuit by a common duct segment and wherein additional means for limiting the flow rate and/or the pressure are disposed on said common duct segment.

11. Apparatus according to claim 9, wherein constrictions are disposed on each connection duct and on the common duct segment.

12. Apparatus according to claim 10, wherein constrictions are disposed on each connection duct and on the common duct segment.

13. Apparatus according to claim 3, further comprising a common duct segment connecting the two connection ducts to the low-pressure circuit, wherein a rated valve is disposed on the common duct segment.

14. Apparatus according to claim 1, wherein the first and second series ducts are respectively normally connected to the low-pressure circuit via respective first and second connection ducts which are connected to said low-pressure circuit by a common duct segment, on which a rated valve is disposed.

15. Apparatus according to claim 1, wherein the first and second series ducts are respectively normally connected to the low-pressure circuit via respective first and second connection ducts which are connected to said low-pressure circuit by a common duct segment, end wherein a valve controlled by a pressure difference between the common duct segment and one of the orifices of the pump is interposed between said common duct segment and the low-pressure circuit.

16. Apparatus according to claim 11, wherein said valve is subjected to the pressure in the common duct segment by a first control chamber connected to said segment, and is subjected to the high pressure of the pump by a second control chamber which acts in opposition to an action of the first chamber, said second chamber being connected to one of the orifices of the pump via a shuttle valve selecting the higher of the pressures at said orifices.

17. Apparatus according to claim 1, further comprising a flow-rate divider which connects the pump to the first elementary motors via two parallel ducts connected to respective ones of said motors.

18. Apparatus according to claim 17, wherein the two parallel ducts are connected together via a connection segment equipped with means for limiting the flow rate of fluid between said parallel ducts.

19. Apparatus according to claim 18, wherein the means for limiting the flow rate of fluid between the parallel ducts comprise a both-way flow-rate regulator.

20. Apparatus according to claim 1, wherein the low-pressure circuit is a booster circuit fed via a booster pump.

21. Apparatus according to claim 1, wherein the low-pressure circuit includes a low-pressure teed duct connected to the low pressure of the pump via a low-pressure selector connected to the two orifices of the pump.

22. Apparatus according to claim 1, wherein the means for limiting the pressure in the series ducts and the means for limiting the flow rate of fluid flowing between the series ducts and the low-pressure circuit are grouped together in a valve unit.

23. Apparatus according to claim 1, wherein the series ducts are connected to the low-pressure circuit via a synchronization selector suitable, in a rest position thereof, for actually putting the series ducts into communication with the low-pressure circuit and for being caused to go into an active position in which said selector prevents fluid from flowing from the series ducts towards the low-pressure circuit.

24. Apparatus according to claim 1, wherein the series ducts are connected to the low-pressure circuit via a short-circuit selector suitable for being caused to go into an active position in which said selector establishes direct communication between the series ducts and the low-pressure circuit, starting from a rest position thereof in which it prevents said direct communication.

* * * * *